United States Patent
Wang

(10) Patent No.: US 6,697,098 B1
(45) Date of Patent: Feb. 24, 2004

(54) CO-CHANNEL INTERFERENCE DETECTION NETWORK FOR AN HDTV RECEIVER

(75) Inventor: Tian Jun Wang, Indianapolis, IN (US)

(73) Assignee: Thomson Licensing S.A., Boulogne, Cedex (FR)

(*) Notice: Subject to any disclaimer, the term of this patent is extended or adjusted under 35 U.S.C. 154(b) by 0 days.

(21) Appl. No.: 09/140,143

(22) Filed: Aug. 26, 1998

(51) Int. Cl.[7] .............................. H04N 5/44; H04N 5/21
(52) U.S. Cl. ..................... 348/21; 348/725; 348/726; 348/723
(58) Field of Search .................. 348/21, 725, 726, 348/723, 724, 470, 608, 607; 375/346, 348, 350, 321, 324

(56) References Cited

U.S. PATENT DOCUMENTS

| | | | |
|---|---|---|---|
| 5,260,793 A | 11/1993 | Citta et al. | 358/167 |
| 5,479,449 A | 12/1995 | Patel et al. | 375/316 |
| 5,594,496 A | 1/1997 | Nielsen et al. | 348/21 |
| 5,661,528 A * | 8/1997 | Han | 348/607 |
| 5,745,187 A * | 4/1998 | Hulyalkar et al. | 348/607 |
| 5,748,226 A | 5/1998 | Limberg | 348/21 |
| 5,798,803 A * | 8/1998 | Limberg | 348/726 |
| 5,801,759 A * | 9/1998 | Limberg | 348/21 |
| 5,821,988 A * | 10/1998 | Citta et al. | 348/21 |
| 5,973,725 A * | 10/1999 | Lee | 348/21 |
| 6,023,306 A * | 2/2000 | Limberg | 348/726 |
| 6,133,942 A * | 10/2000 | Lee | 348/21 |
| 6,201,576 B1 * | 3/2001 | Raghunath et al. | 348/558 |
| 6,226,049 B1 * | 5/2001 | Oh | 348/607 |

FOREIGN PATENT DOCUMENTS

GB    2 309 140 A    7/1997    ............ H04N/5/21

OTHER PUBLICATIONS

Wayne Bretl et al., Zenith Electronics, *VSB Modem Subsystem Design for Grand Alliance Digital Television Receivers*, IEEE Transactions on Consumer Electronics, vol. 41, No. 3, Aug. 1995, pp. 773–786.

6.2.3.6 *Interference Rejection Filter* of "Grand Alliance HDTV System Specification", Apr. 14, 1994, 6.P.10–6.P.11 and Figure 16.

* cited by examiner

*Primary Examiner*—Michael H. Lee
*Assistant Examiner*—Jean W. Désir
(74) *Attorney, Agent, or Firm*—Joseph S. Tripoli; Joseph J. Laks; Ronald H. Kurdyla

(57) ABSTRACT

A receiver for processing a VSB modulated signal containing terrestrial broadcast high definition television information and a pilot component includes an input analog-to-digital converter (19) for producing a datastream which is oversampled at twice the received symbol rate, and a digital demodulator (22; FIG. 3) with a data reduction network (330, 332) in a phase control loop. A segment sync detector (24; FIG. 4, 5) uses an abbreviated correlation reference pattern to recover a twice symbol rate sampling clock for the digital converter (19). A DC offset associated with the pilot component is removed (26; FIG. 6) from the demodulated signal before it is applied to an NTSC interference detection network (30; FIG. 7). The interference detection network includes a comb filter network (710, 718) responsive to a twice symbol rate sampled data datastream, and exhibits a sample delay dimensioned to avoid aliasing in the combed frequency spectrum (FIG. 8), thereby increasing the effectiveness of NTSC co-channel interference detection.

17 Claims, 6 Drawing Sheets

CO-CHANNEL INTERFERENCE DETECTION NETWORK FOR AN HDTV RECEIVER

FIELD OF THE INVENTION

This invention concerns a receiver system for processing a high definition television signal, eg., of the VSB-modulated type proposed by the Grand Alliance in the United States.

BACKGROUND OF THE INVENTION

The recovery of data from modulated signals conveying digital information in symbol form usually requires three functions at a receiver: timing recovery for symbol synchronization, carrier recovery (frequency demodulation to baseband), and channel equalization. Timing recovery is a process by which a receiver clock (timebase) is synchronized to a transmitter clock. This permits a received signal to be sampled at optimum points in time to reduce slicing errors associated with decision-directed processing of received symbol values. Carrier recovery is a process by which a received RF signal, after being frequency down converted to a lower intermediate frequency passband (eg., near baseband), is frequency shifted to baseband to permit recovery of the modulating baseband information. Adaptive channel equalization is a process by which the effects of changing conditions and disturbances in the signal transmission channel are compensated for. This process typically employs filters that remove amplitude and phase distortions resulting from frequency dependent time variant characteristics of the transmission channel, to provide improved symbol decision capability.

SUMMARY OF THE INVENTION

In accordance with the principles of the present invention, a system for processing a received Vestigial Sideband (VSB) modulated signal containing high definition television information includes an NTSC co-channel interference detection network, comprising a comb filter network responsive to an oversampled symbol datastream and having a predetermined delay for producing a frequency combed spectrum without aliasing.

DETAILED DESCRIPTION OF THE DRAWING

Figure 1:
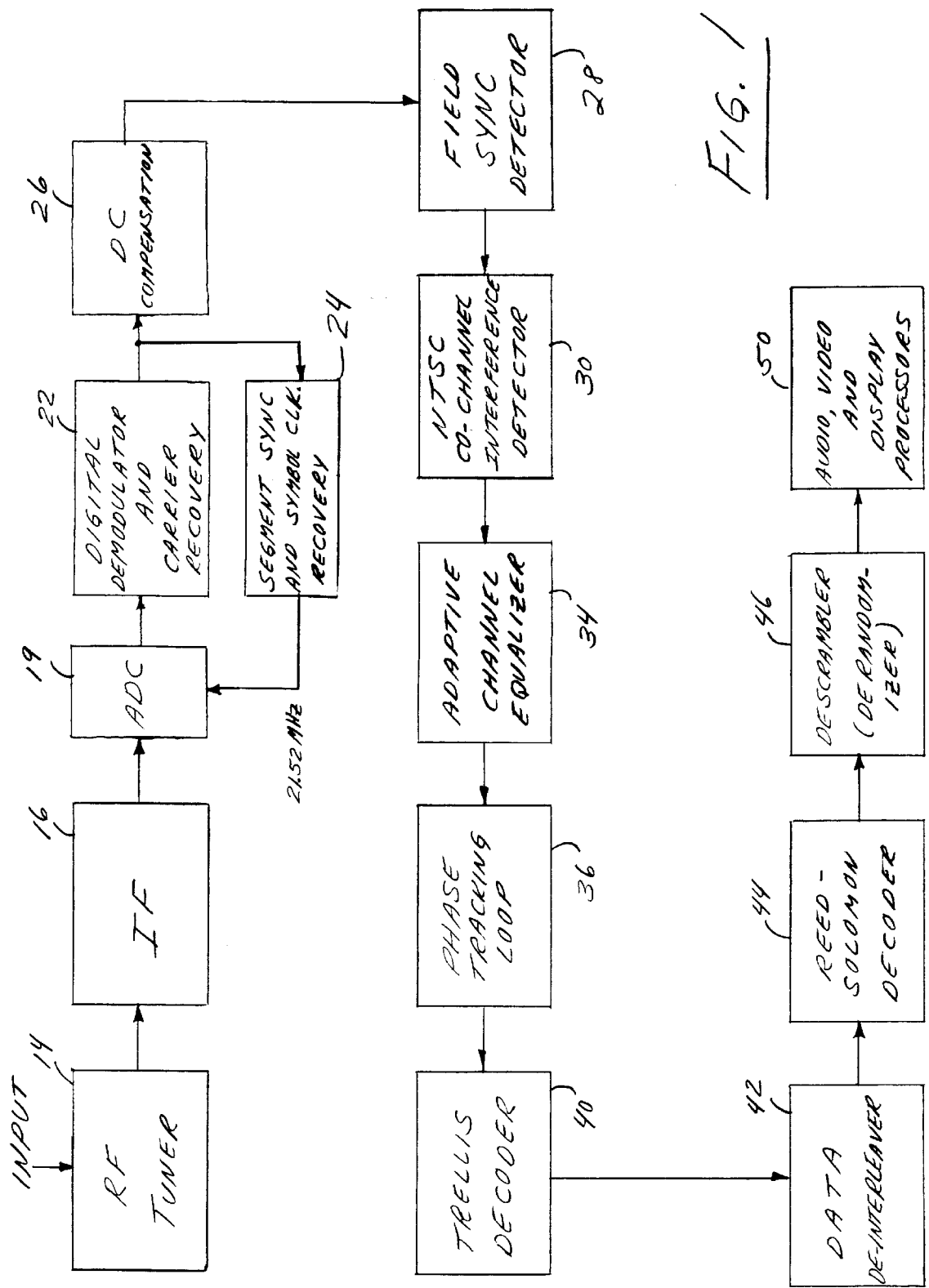
FIG. 1 is a block diagram of a portion of a high definition television (HDTV) receiver including apparatus according to the principles of the present invention.

In FIG. 1, a terrestrial broadcast analog Input HDTV signal is processed by an input network 14 including RF tuning circuits and an intermediate frequency (IF) processor 16 including a double conversion tuner for producing an IF passband output signal, and appropriate automatic gain control (AGC) circuits. The received signal is a carrier suppressed 8-VSB modulated signal as proposed by the Grand Alliance and adopted for use in the United States. Such a VSB signal is represented by a one-dimensional data symbol constellation wherein only one axis contains quantized data to be recovered by the receiver. To simplify the Figure, not shown are signals for clocking the illustrated functional blocks.

Figure 2:
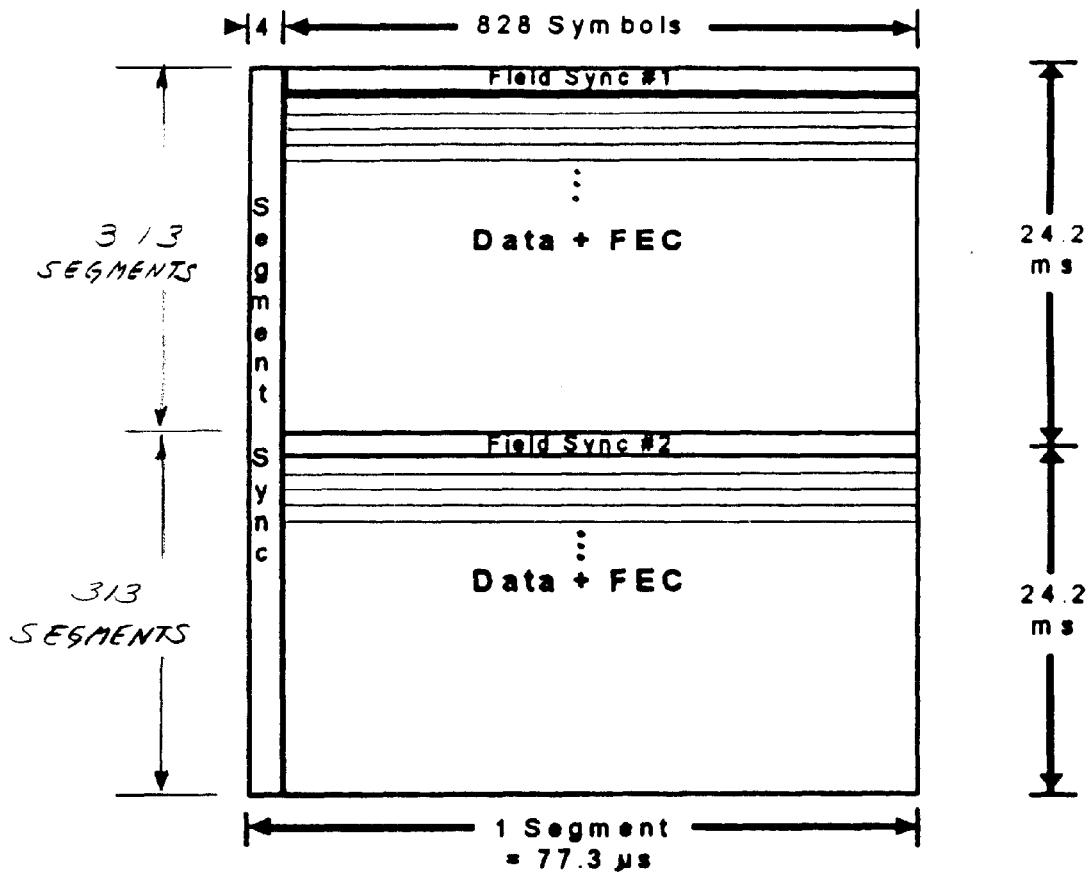
FIG. 2 depicts a data frame format for a VSB modulated signal according to the Grand Alliance HDTV system in the United States.

As described in the Grand Alliance HDTV System Specification dated Apr. 14, 1994, the VSB transmission system conveys data with a prescribed data frame format as shown in FIG. 2. A small pilot signal at the suppressed carrier frequency is added to the transmitted signal to help achieve carrier lock at a VSB receiver. Referring to FIG. 2, each data frame comprises two fields with each field including 313 segments of 832 multilevel symbols. The first segment of each field is referred to as a field sync segment, and the remaining 312 segments are referred to as data segments. The data segments typically contain MPEG compatible data packets. Each data segment comprises a four symbol segment sync character followed by 828 data symbols. Each field segment includes a four symbol segment sync character followed by a field sync component comprising a predetermined 511 symbol pseudorandom number (PN) sequence and three predetermined 63 symbol PN sequences, the middle one of which is inverted in successive fields. A VSB mode control signal (defining the VSB symbol constellation size) follows the last 63 PN sequence, which is followed by 96 reserved symbols and 12 symbols copied from the previous field.

Continuing with FIG. 1, the passband IF output signal from unit 16 is converted to an oversampled digital symbol datastream by an analog to digital converter 19. The output oversampled digital datastream from ADC 19 is demodulated to baseband by an all digital demodulator/carrier recovery network 22. This is done by an all digital phase locked loop in response to the small reference pilot carrier in the received VSB datastream. Unit 22 produces an output I-phase demodulated symbol datastream as described in greater detail with regard to FIG. 3.

ADC 19 oversamples the input 10.76 Msymbols/sec VSB symbol datastream with a 21.52 MHz sampling clock, i.e., twice the received symbol rate, thereby providing an oversampled 21.52 Msamples/sec datastream with two samples per symbol. The use of such two sample per symbol sample based processing, rather than symbol-by-symbol (one sample per symbol) symbol based processing, produces advantageous operation of subsequent signal processing functions such as are associated with DC compensation unit 26 and NTSC interference detector 30 for example, as will be discussed.

Associated with ADC 19 and demodulator 22 is a segment sync and symbol clock recovery network 24. Network 24 detects and separates the repetitive data segment sync components of each data frame from the random data. The segment syncs are used to regenerate a properly phased 21.52 MHz clock which is used to control the datastream symbol sampling by analog to digital converter 19. As will be discussed in connection with FIGS. 4 and 5, network 24 advantageously uses an abbreviated two-symbol correlation reference pattern and associated two symbol data correlator to detect the segment sync.

A DC compensation unit 26 uses an adaptive tracking circuit to remove from the demodulated VSB signal a DC offset component due to the pilot signal component, as will be discussed in connection with FIG. 6. Unit 28 detects the data field sync component by comparing every received data segment with an ideal field reference signal stored in memory in the receiver. In addition to field synchronization, the field sync signal provides a training signal for channel equalizer 34.

NTSC interference detection and rejection are performed by unit 30 as will be discussed in greater detail with regard to FIGS. 7 and 8. Afterwards, the signal is adaptively equalized by channel equalizer 34 which may operate in a combination of blind, training, and decision-directed modes. Equalizer 34 may be of the type described in the Grand Alliance HDTV System Specification and in an article by W. Bretl et al., "VSB Modem Subsystem Design for Grand Alliance Digital Television Receivers," IEEE Transactions on Consumer Electronics, August 1995. Equalizer 34 also may be of the type described in a copending U.S. Patent application Ser. No. (RCA 88,947) of Shiue et al. The output datastream from detector 30 is downconverted to a one sample/symbol (10.76 Msymbols/sec) datastream prior to equalizer 34. This downconversion may be accomplished by a suitable downsampling network (not shown to simplify the drawing).

Equalizer 34 corrects channel distortions, but phase noise randomly rotates the symbol constellation. Phase tracking network 36 removes the residual phase and gain noise in the output signal from equalizer 34, including phase noise which has not been removed by the preceding carrier recovery network in response to the pilot signal. The phase corrected signal is then trellis decoded by unit 40, de-interleaved by unit 42, Reed-Solomon error corrected by unit 44, and descrambled (de-randomized) by unit 46. Afterwards, a decoded datastream is subjected to audio, video and display processing by unit 50.

Tuner 14, IF processor 16, field sync detector 28, equalizer 34, phase tracking loop 36, trellis decoder 40, de-interleaver 42, Reed-Solomon decoder 44 and descrambler 46 may employ circuits of the type described in the Grand Alliance HDTV System Specification of Apr. 4, 1994, and in the Bretl, et al. article mentioned above. Circuits suitable for performing the functions of units 19 and 50 are well-known.

Demodulation in unit 22 is performed by an all digital automatic phase control (APC) loop to achieve carrier recovery. The phase locked loop uses the pilot component as a reference for initial acquisition and a normal phase detector for phase acquisition. The pilot signal is embedded in the received datastream, which contains data exhibiting a random, noise-like pattern. The random data is essentially disregarded by the filtering action of the demodulator APC loop. The 10.76 Msymbols/sec input signal to ADC 19 is a near baseband signal with the center of the VSB frequency spectrum at 5.38 MHz and the pilot component situated at 2.69 MHz. The input datastream is advantageously two-times oversampled by ADC 19 at 21.52 MHz. In the demodulated datastream from unit 22 the pilot component has been frequency shifted down to DC.

Figure 3:
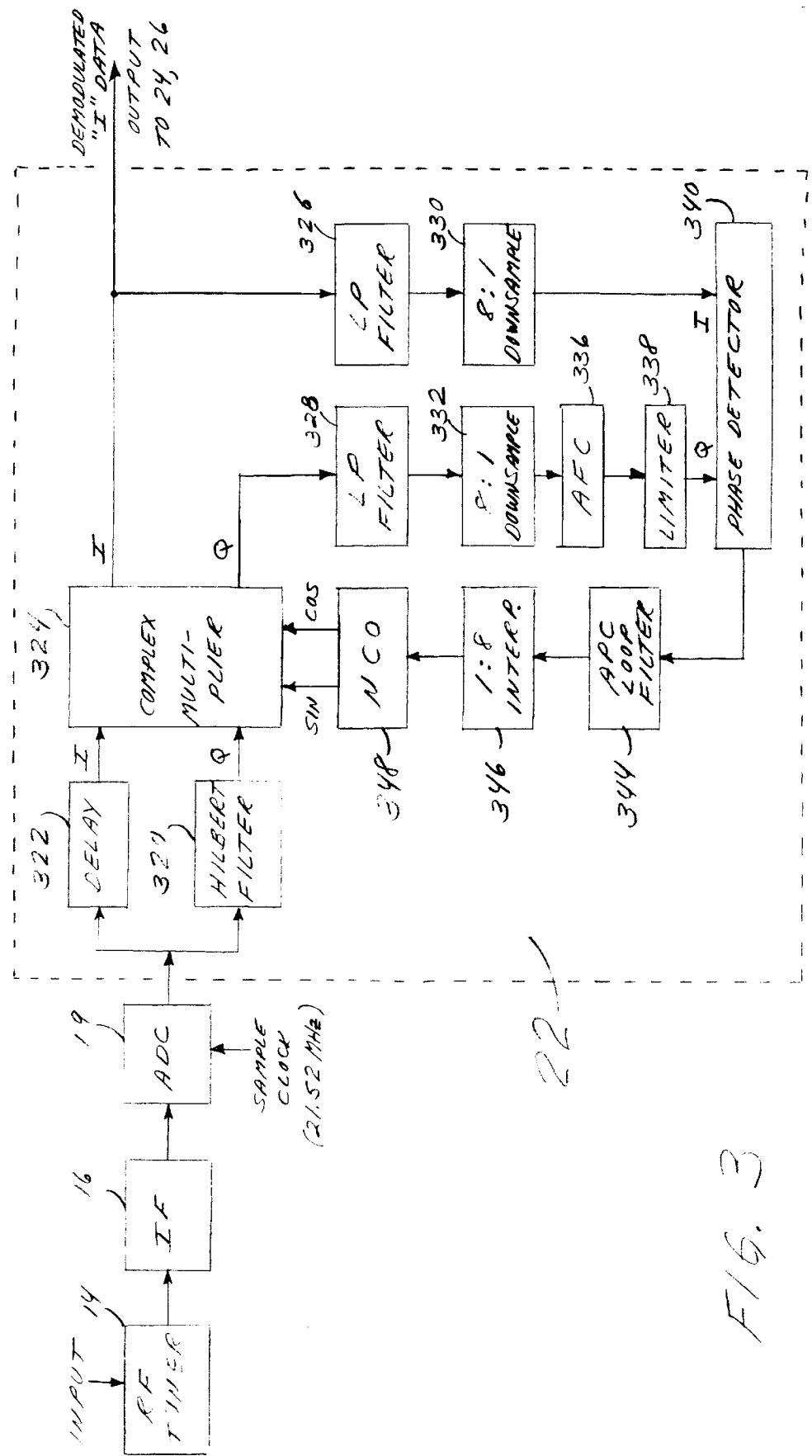
FIG. 3 shows details of a digital demodulator/carrier recovery network in FIG. 1.

FIG. 3 show details of digital demodulator 22. The 8-VSB modulated, oversampled digital symbol datastream from ADC 19, containing the very low frequency pilot component, is applied to inputs of a Hilbert filter 320 and a delay unit 322. Filter 320 separates the incoming IF sampled datastream into "I" (in phase) and "Q" (quadrature phase) components. Delay 322 exhibits a delay that matches the delay of Hilbert filter 320. The I and Q components are rotated to baseband using complex multiplier 324 in an APC loop. Once the loop is synchronized, the output of multiplier 324 is a complex baseband signal. The output I datastream from multiplier 324 is used as the actual demodulator output, and is also used to extract the pilot component of the received datastream using low pass filter 326. The output Q datastream from multiplier 324 is used to extract the phase of the received signal.

In the phase control loop, the I and Q output signals from multiplier 324 are respectively applied to low pass filters 326 and 328. Filters 326 and 328 are Nyquist low pass filters with a cut-off frequency of approximately 1 MHz, and are provided to reduce the signal bandwidth prior to 8:1 data downsampling by units 330 and 332. The downsampled Q signal is filtered by an automatic frequency control (AFC) filter 336. After filtering, the Q signal is amplitude limited by unit 338 to reduce the dynamic range requirements of phase detector 340. Phase detector 340 detects and corrects the phase difference between the I and Q signals applied to its inputs, and develops an output phase error signal which is filtered by an APC filter 344, eg., a second order low pass filter. The phase error detected by unit 340 represents a frequency difference between the expected pilot signal frequency near DC, and the received pilot signal frequency.

If the received pilot signal exhibits an expected frequency near DC, AFC unit 336 will produce no phase shift. The I and Q channel pilot components input to phase detector 340 will exhibit no deviation from a mutually quadrature phase relationship, whereby phase detector 340 produces a zero or near zero value phase error output signal. However, if the received pilot signal exhibits an incorrect frequency, AFC unit 336 will produce a phase shift. This will result in an additional phase difference between the I and Q channel pilot signals applied to the inputs of phase detector 340. Detector 340 produces an output error value in response to this phase difference.

The filtered phase error signal from filter 344 is upsampled 1:8 by interpolator 346 to account for the prior downsampling by units 330 and 332, so that NCO 348 operates at 21.52 MHz. The output of interpolator 346 is applied to a control input of NCO 348, which locally regenerates the pilot signal for demodulating the received datastream. NCO 348 includes sine and cosine look-up tables for regenerating the pilot tone at a correct phase in response to the phase control signal from units 340, 344 and 346. The outputs of NCO 348 are controlled until the I and Q signal outputs of multiplier 324 cause the phase error signal produced by detector 340 to be substantially zero, thereby indicating that a properly demodulated baseband I signal is present at the output of multiplier 324.

In digital demodulator 22, the main signal processing engine essentially comprises elements 336, 338, 340 and 344. The 8:1 downsampling provided by units 330 and 332 advantageously saves demodulator processing power and hardware and permits processing efficiencies by allowing APC loop elements 336, 338, 340 and 344 to be clocked at a lower clock rate, i.e., using a 21.52 MHz/8 or 2.69 MHz clock instead of a 21.52 MHz clock. When a digital signal processor (DSP) is used to implement network 22 and the phase detector loop in particular, the described data reduction results in software efficiencies by requiring proportionally fewer lines of instruction code, for example. DSP machine cycles are made available for other signal processing purposes. When an application specific integrated circuit (ASIC) is used to implement network 22, the data reduction results in reduced hardware and power requirements, as well as reduced integrated circuit surface area. The demodulator advantageously uses the pilot component to achieve carrier recovery, and employs feed-forward processing rather than more complicated and time consuming feedback processing using slicer decision data.

Figure 4:
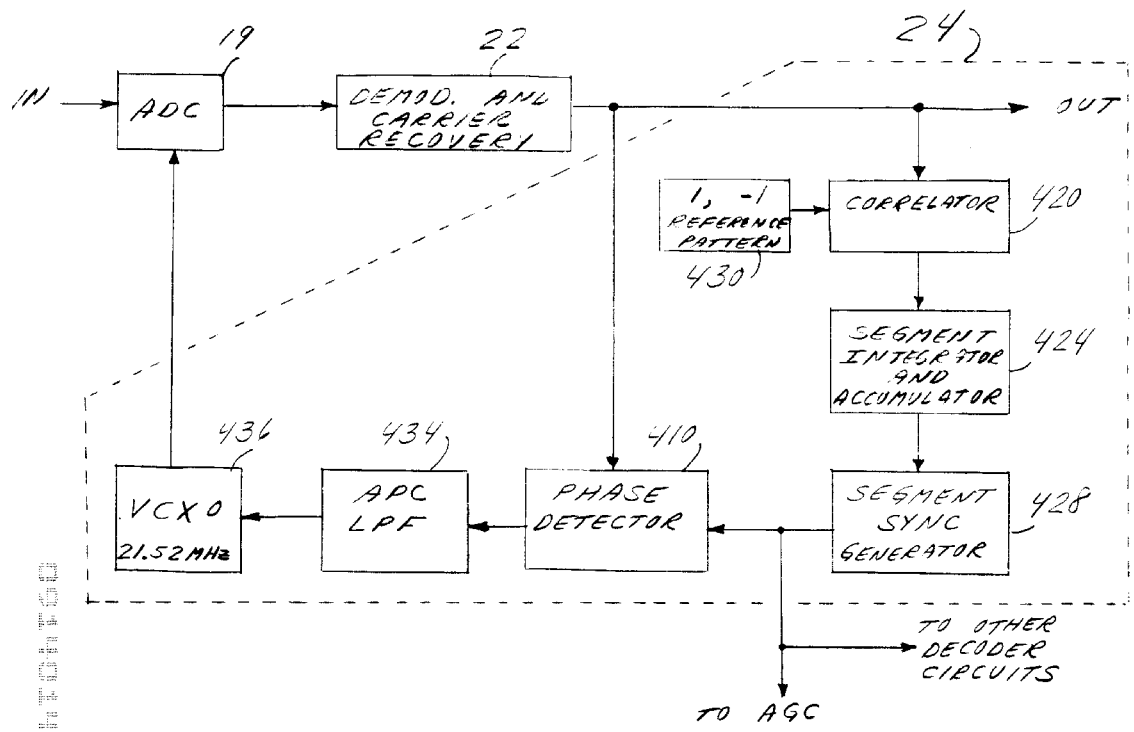
FIG. 4 shows details of a segment sync detector and symbol clock recovery network in FIG. 1.
Figure 5:
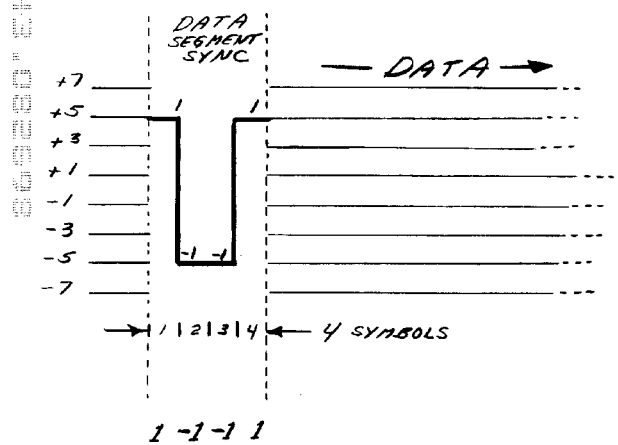
FIG. 5 depicts a signal waveform helpful in understanding the operation of the network in FIG. 4.

The demodulated I channel datastream is applied to segment sync and symbol clock recovery unit 24 as shown in detail in FIGS. 4 and 5. When the repetitive data segment sync pulses are recovered from the random data pattern of the received datastream, the segment syncs are used to achieve proper symbol timing by regenerating a properly phased 21.52 MHz twice symbol rate sampling clock for controlling the sampling operation of analog to digital converter 19 (FIG. 1). FIG. 5 depicts a portion of an eight level (−7 to +7) data segment with an associated segment sync, for an 8-VSB modulated terrestrial broadcast signal in accordance with the Grand Alliance HDTV specification. The segment sync occurs at the beginning of each data segment and occupies a four symbol interval. The segment sync is defined by a pattern 1 −1 −1 1 corresponding to the amplitude levels of the segment sync pulse, from +5 to −5.

The four symbol segment sync occurs every 832 symbols but is difficult to locate in a demodulated VSB digital datastream since the data has a random, noise-like characteristic. To detect the segment sync under these conditions, it has been conventional practice to apply the demodulated I channel datastream to one input of a data correlator, and to apply a reference pattern having the 1 −1 −1 1 characteristic to a reference input of the correlator for comparison with the demodulated data. The correlator produces reinforcement consistent with the reference pattern every 832 symbols. Reinforced data events are accumulated by an accumulator associated with the correlator. Intervening random (non-reinforced) correlations disappear relative to the reinforced correlated segment sync components. Networks for recovering segment sync data in this manner are known, for example, from the Grand Alliance HDTV specification and from the Bretl, et al. article mentioned previously.

It is herein recognized that although the segment sync is generally difficult to locate, it is particularly difficult to detect in the presence of multipath ("ghost") conditions. Moreover, it is herein recognized that the last two characteristics (amplitude levels) of the segment sync pattern (−1 1) are easily corrupted by transmission distortions such as multipath, but that the first two characteristics of the segment sync pattern (1 −1) are significantly more difficult to corrupt. In addition, it has been determined that even if the first two amplitude characteristics (1 −1) of the segment sync pattern are corrupted, they typically corrupt in the same way, which makes the first two characteristics more easily detected by correlation techniques. Thus in the disclosed system the reference pattern applied to the correlator for detecting segment sync is preferably constituted by the first two pattern levels (1 −1) rather than by all four pattern levels (1 −1 −1 1). Thus the correlator reference pattern preferably encompasses only a two symbol interval.

In FIG. 4, the oversampled output datastream from demodulator 22 (FIGS. 1 and 3) is applied to one signal input of phase detector 410 and to an 832 symbol correlator 420. The other signal input of phase detector 410 receives an input signal from a data correlation processing path including correlator 420, an associated correlation reference pattern generator 430 coupled to a reference input of correlator 420, and a segment integrator and accumulator 424. Correlator 420 essentially responds to symbol coded data segment sync. Reference pattern generator 430 provides the relatively simple, abbreviated reference pattern 1 −1, thereby permitting the use of a simpler correlator network. The simpler reference pattern is less likely to produce confusion in the sync detection process, particularly in poor signal conditions, because more stable, reliable information is used. The disclosed system is less likely to be confused if two of four correlations are corrupt. In addition, calculation time by correlator 420 is significantly reduced.

The output from correlator 420 is integrated and accumulated by unit 424. A segment sync generator 428, including a comparator with a predetermined threshold, responds to the output of unit 424 by generating a segment sync at appropriate times in the datastream corresponding to data segment sync intervals. This occurs when the accumulation of reinforced data events (segment sync appearances) exceeds a predetermined level. Phase detector 410 compares the phase of the segment sync generated by unit 428 with the phase of the segment sync appearing in the demodulated datastream from unit 22, and produces an output phase error signal. This error signal is low pass filtered by automatic phase control (APC) filter 434 to produce a signal suitable for controlling a 21.52 MHz voltage controlled crystal oscillator (VCXO) 436, which provides the 21.52 MHz oversampling clock for ADC 19. This sampling clock exhibits proper timing when the phase error signal is substantially zero by APC action. Symbol timing (clock) recovery is complete at this point. The segment sync generated by unit 428 is also applied to other decoder circuits including automatic gain control (AGC) circuits (not shown).

Due to the low frequency suppressed carrier pilot component in the received VSB signal, there is a DC offset in the demodulated output I symbol data from demodulator 22. This DC offset is associated with every symbol and is removed by compensation network 26 (FIG. 1) before further processing. Removal of the transmitted symbol DC component facilitates recovery of the symmetrical symbol values, i.e., ±7 ±5 ±3 ±1, of an 8-VSB signal. FIG. 6 shows details of network 26, which is essentially a DC tracking feedback network. The arrangement of network 26 in FIG. 6 is advantageously clocked at twice the symbol rate to produce rapid elimination of the DC component. This action promotes rapid convergence of the receiver and its several interdependent subsystems to rapidly produce proper operating conditions for processing received video data for display.

Figure 6:
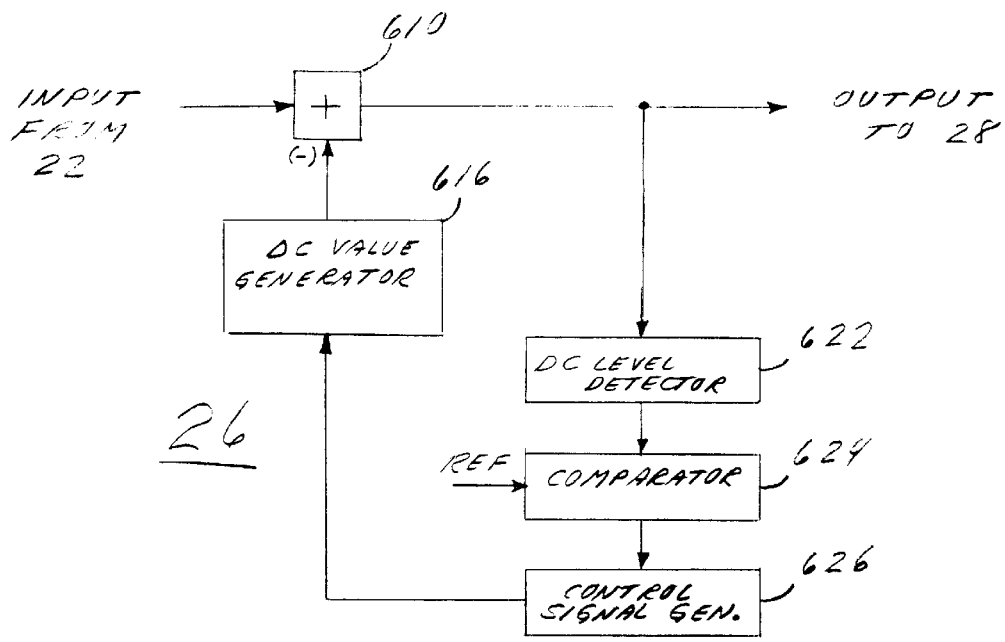
FIG. 6 shows details of a compensation network for removing a DC offset in the symbol datastream processed by the system of FIG. 1.

In FIG. 6, the oversampled demodulated datastream containing the unwanted DC offset is applied to one input of a subtractive combiner 610. An inverting input (−) of combiner 610 receives a DC compensation voltage from a DC voltage generator 616 in response to a control signal produced in response to the output of combiner 610 as follows. The DC offset in the output signal from combiner 610 is progressively attenuated by feedback action at the twice symbol rate oversampling rate. This DC offset is detected by unit 622 and compared to a reference by comparator 624. The output of comparator 624 indicates the magnitude and polarity of the residual DC offset and is used to produce a control signal from control signal generator 626. The control signal in turn causes generator 616 to incrementally adjust the magnitude and polarity of a DC value which is combined with the demodulated datastream. This process continues until a steady state condition is reached wherein by feedback action no further DC value adjustments are provided by unit 616. Generator 616 may provide both positive and negative DC compensation values since transmission channel disturbances may cause the (positive) DC offset added at the transmitter to vary such that both positive and negative compensation values are needed at the receiver.

Figure 7:
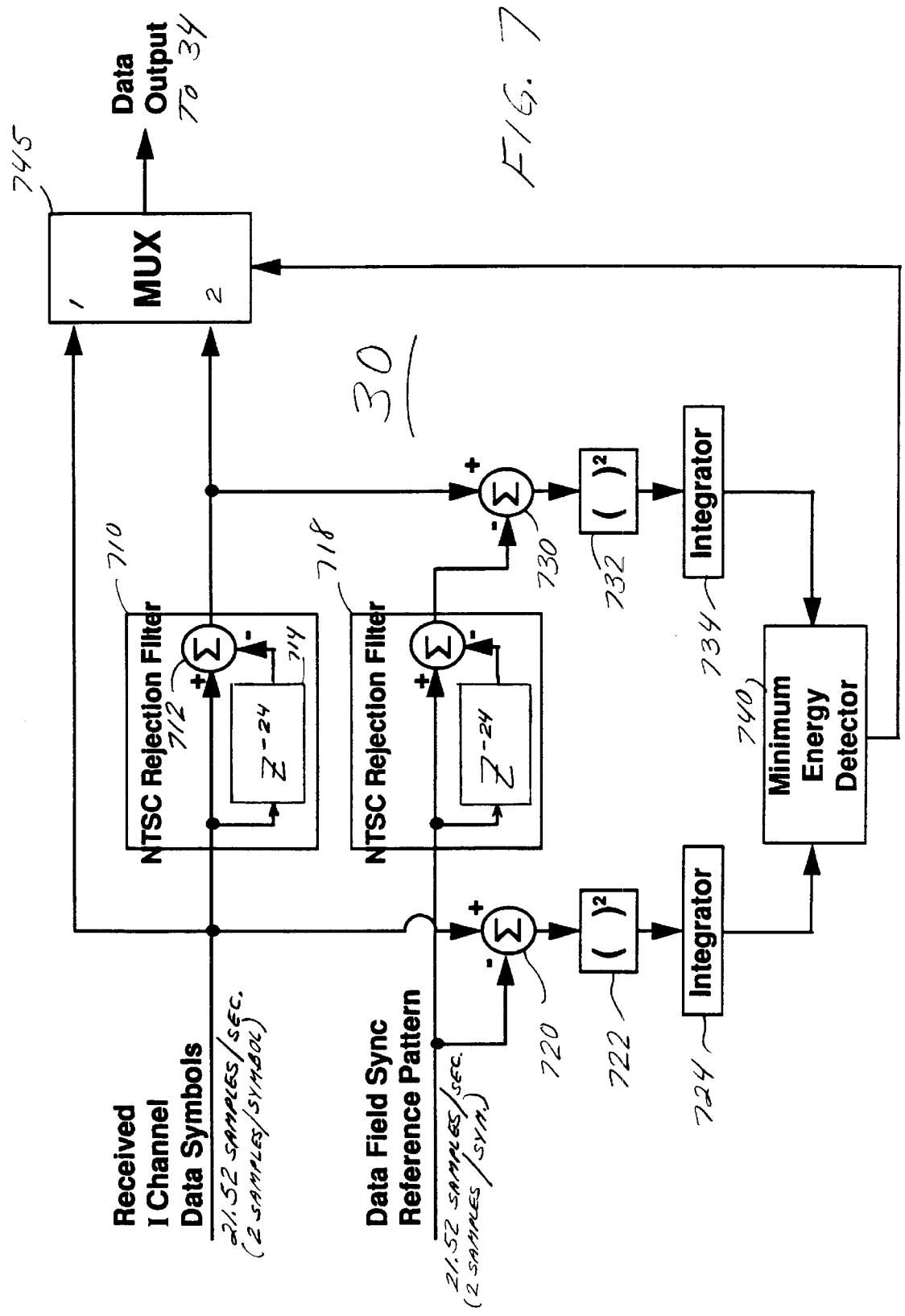
FIG. 7 shows details of an NTSC co-channel interference detection network in the system of FIG. 1.

FIG. 7 shows details of NTSC co-channel interference detection network 30 in FIG. 1. As explained in the Grand Alliance HDTV System Specification, the interference rejection properties of the VSB transmission system are based on the frequency locations of the principle components of the NTSC cochannel interfering signal within the 6 MHz television channel, and the periodic notches of a VSB receiver baseband comb filter. These comb filter notches exhibit high attenuation (nulls) at frequency locations of interfering high energy NTSC components. These components include the video carrier located 1.25 MHz from the lower band edge, the chrominance subcarrier located 3.58 MHz higher than the video carrier frequency, and the sound carrier located 4.5 MHz above the video carrier frequency.

NTSC interference is detected by the circuit shown in FIG. 7, where the signal-to-interference plus noise of field sync patterns is measured at the input and output of a comb filter network, and these patterns are compared with each other. A reference field sync pattern employed for this purpose is a programmed, locally stored "ideal" version of the received VSB signal field sync pattern.

In FIG. 7, oversampled demodulated I channel symbol data are applied to an input of an NTSC rejection comb filter 710, to a first input of multiplexer 745, and to an input of a subtractive combiner 720. Comb filter 710 includes a subtractor 712 which subtracts samples delayed by delay element 714 from the input I data to produce a combed I channel symbol datastream. Comb filter 710 produces significant amplitude attenuation, or "nulls," at the high energy interfering NTSC frequencies noted previously. The combed I data from filter 710 is applied to a second input of multiplexer 745. Comb filter delay element 714 advantageously exhibits a 24-sample delay as will be discussed subsequently.

A programmed 21.52 Msamples/sec (twice symbol rate) reference field sync pattern is obtained from local memory during field sync intervals of the received datastream. The field sync reference pattern is applied to an input of NTSC rejection comb filter 718, and to an inverting input (−) of combiner 720. Comb filter 718 is similar to comb filter 710, and also includes a delay element which advantageously exhibits a 24-sample delay. The network of FIG. 7, in particular comb filters 710, 718 and the associated delay networks, is clocked at 21.52 MHz.

A first error signal produced at the output of combiner 720 represents the difference between the received field sync pattern in the input datastream, and the reference field sync pattern. This error signal is squared by unit 722 and integrated by unit 724. A second error signal produced at the output of combiner 730 represents the difference between the received field sync pattern after comb filtering by filter 710, and the reference field sync pattern after comb filtering by filter 718. This second error signal is squared by unit 732 and integrated by unit 734. The outputs of units 722 and 732 represent the energy of the respective error signals. The integrated output signals from integrators 724 and 734 represent the signal-to-interference plus noise content of the uncombed and combed received field sync components, respectively. These integrated energy-representative signals are applied to respective inputs of an energy detector (comparator) 740, which compares the magnitudes of the integrated first and second error signals. The output signal from detector 740 is applied to a control input of multiplexer 745 for causing multiplexer 745 to provide as a Data Output that one of its input signals which exhibits higher quality, i.e., better signal-to-noise plus interference ratio. Thus in the case of significant NTSC co-channel interference the comb filtered output signal from filter 710 will be output from multiplexer 745, while the unfiltered received symbol datastream will be output in the absence of such interference.

The use of oversampled I channel data and field sync reference pattern data together with the use of a 24-sample delay in comb filters 710 and 718 advantageously produce full spectrum information about NTSC co-channel interference. This advantageously results in more accurate NTSC interference analysis and detection and better comb filtering. Specifically, the use of 24 sample delays in comb filters 710 and 718 with oversampled input data and corresponding circuit clocking results in a comb filtered frequency spectrum which is not corrupted by phase and amplitude aliasing effects which would be produced by providing an input datastream at the 10.76 Msymbols/sec symbol rate, and by operating comb filters 710 and 718 at the 10.76 Msymbols/sec symbol rate. The resulting frequency spectrum produced at the outputs of comb filters 710 and 718 is shown in FIG. 8 and includes two comb filtered full NTSC passband components centered about but separated from 10.76 MHz. Attenuation notches appear at the interfering high energy NTSC frequencies as mentioned.

FIG. 7 illustrates one form of an NTSC cochannel interference detector including elements 722, 724, 732, 734 and 740. However, other types of detector may be used. Thus these elements may be represented by a four-input detector, i.e., a so-called "black box" where the detector may be programmed to operate in accordance with the requirements of a particular system. In such case the four inputs are the two oversampled (two sample/symbol) inputs to combiner 720, and the two oversampled inputs to combiner 730, with the output of filter 710 to the input of combiner 730 being particularly important.

Figure 8:
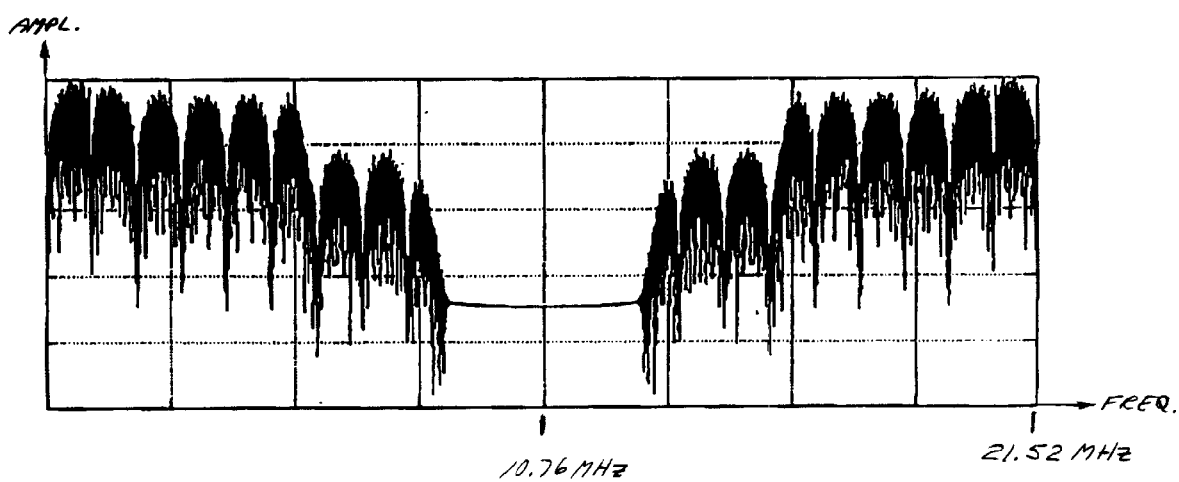
FIG. 8 shows a frequency spectrum associated with the operation of the network in FIG. 7.

The arrangement of FIG. 7 produces a clean frequency spectrum, as shown in FIG. 8, without associated amplitude and phase corruption (aliasing) caused by frequency overlapping of the upper bandedge of the lower passband component with the lower bandedge of the upper passband component. Consequently, co-channel interference detection by elements 720, 722, 724, 730, 732, 734 and 740 is more accurate than detection by a system employing comb filters with 12-sample delays processing input data at the 10.76 Msymbols/sec symbol rate. In the latter case, amplitude and phase corruption is likely to be produced in the vicinity of 5.38 MHz, where the upper and lower passband components overlap, when the passband components are imperfectly matched and do not cancel at such overlap. Such imperfect matching is likely to occur under signal channel conditions including multipath, for example. This aliasing condition reduces the effectiveness of NTSC co-channel interference detection and is avoided by the disclosed system.

What is claimed is:

1. In a system for processing a received Vestigial Sideband (VSB) modulated datastream containing high definition video data represented by a VSB symbol constellation and subject to exhibiting co-channel interference, said data having a data frame format constituted by a succession of data frames comprising a field sync component prefacing a plurality of data segments, said apparatus comprising:

means responsive to said received datastream for producing a demodulated datastream;

means for filtering said demodulated datastream to produce a filtered demodulated datastream;

means for providing a reference signal;

means for filtering said reference signal to produce a filtered reference signal;

an NTSC interference detector having an input network, and an output coupled to a signal processing path; and means for providing said demodulated datastream, said reference signal, said filtered demodulated datastream and said filtered reference signal to said input network; wherein said demodulated datastream and said filtered demodulated datastream applied to said input network contain symbol data which is oversampled at a multiple of the symbol rate of said received datastream.

2. A system according to claim 1, wherein said means for filtering comprises a comb filter network; and said input network comprises a first differencing network responsive to said demodulated datastream and said filtered demodulated datastream, and a second differencing network responsive to said reference signal and to said filtered reference signal.

3. A system according to claim 1, wherein said reference signal is a field sync reference pattern.

4. In a system for processing a received Vestigial Sideband (VSB) modulated datastream containing high definition video data represented by a VSB symbol constellation and subject to exhibiting co-channel interference, said data having a data frame format constituted by a succession of data frames comprising a field sync component prefacing a plurality of data segments, said apparatus comprising:

means responsive to said received datastream for producing a demodulated datastream;

means for filtering said demodulated datastream to produce a filtered demodulated datastream;

means for providing a reference signal;

means for filtering said reference signal to produce a filtered reference signal;

an NTSC interference detector having an input network, and an output coupled to a signal processing path; and means for providing said demodulated datastream, said reference signal, said filtered demodulated datastream and said filtered reference signal to said input network; wherein said demodulated datastream and said filtered demodulated datastream applied to said input network contain symbol data which is oversampled at a multiple of the symbol rate of said received datastream; and wherein said reference signal and said filtered reference signal contain symbol data which is oversampled at said multiple of the symbol rate of said received datastream.

5. In a system for processing a received Vestigial Sideband (VSB) modulated datastream containing high definition video data represented by a VSB symbol constellation and subject to exhibiting co-channel interference, said data having a data frame format constituted by a succession of data frames comprising a field sync component prefacing a plurality of data segments, a method comprising:

demodulating said received datastream to produce a demodulated datastream;

filtering said demodulated datastream to produce a filtered demodulated datastream;

providing a reference signal;

filtering said reference signal to produce a filtered reference signal; and providing said demodulated datastream, said filtered demodulated datastream, said reference signal and said filtered reference signal to signal inputs of an interference detector; wherein said demodulated datastream and said filtered demodulated datastream contain symbol data which is oversampled at a multiple of the symbol rate of said received VSB datastream.

6. A method according to claim 5, wherein said providing step includes the steps of differencing said demodulated datastream and said reference signal; and differencing said filtered demodulated datastream and said filtered reference signal.

7. In a system for processing a received Vestigial Sideband (VSB) modulated datastream containing high definition video data represented by a VSB symbol constellation and subject to exhibiting co-channel interference, said data having a data frame format constituted by a succession of data frames comprising a field sync component prefacing a plurality of data segments, a method comprising demodulating said received datastream to produce a demodulated datastream;

filtering said demodulated datastream to produce a filtered demodulated datastream;

providing a reference signal;

filtering said reference signal to produce a filtered reference signal; and providing said demodulated datastream, said filtered demodulated datastream, said reference signal and said filtered reference signal to signal inputs of an interference detector; wherein said demodulated datastream and said filtered demodulated datastream contain symbol data which is oversampled of a multiple of the symbol rate of said received VSB datastream; and wherein said reference signal and said filtered reference signal contain symbol data exhibiting the oversampled data rate of said demodulated datastream.

8. A method according to claim 7, wherein said reference signal is a field sync reference pattern.

9. In a system for processing a received Vestigial Sideband (VSB) modulated datastream containing high definition video data represented by a VSB symbol constellation and subject to exhibiting co-channel interference, said data having a data frame format constituted by a succession of data frames comprising a field sync component prefacing a plurality of data segments, said apparatus comprising:

a preprocessor responsive to said received datastream for producing a demodulated symbol datastream;

a filter responsive to said demodulated datastream for attenuating information at frequencies corresponding to significant NTSC co-channel interference energy, for producing a filtered demodulated datastream;

an signal quality analyzer responsive to said demodulated datastream and to said filtered datastream for producing a control signal representing the relative interference content of said demodulated datastream and said filtered datastream; and an output network responsive to said control signal for providing to an output channel said filtered demodulated datastream when said control signal indicates the presence of significant interference, and otherwise providing said demodulated symbol datastream to said output channel; wherein said demodulated datastream produced by said preprocessor is oversampled at a multiple of the symbol rate of said received datastream; and said filter network exhibits more than a twelve sample delay.

10. Apparatus according to claim 9, wherein said demodulated symbol datastream is oversampled at twice the symbol rate of said received datastream; and said filter exhibits at least a twenty-four sample delay.

11. Apparatus according to claim 9, wherein said filter produces an output frequency spectrum constituted by non-overlapping upper and lower passbands.

12. Apparatus according to claim 9, wherein said filter is a comb filter network comprising
 (a) a first comb filter responsive to said demodulated datastream, and an output; and
 (b) a second comb filter responsive to a reference signal, and an output; and said analyzer includes
 (a) a first detector for determining a difference between said demodulated datastream and said reference signal,
 (b) a second detector for determining a difference between combed output signals from said first and second comb filters; and
 (c) means for comparing outputs from said first and second detectors to produce said control signal.

13. Apparatus according to claim 12, wherein said reference signal is a field sync reference pattern.

14. In a system for processing a received Vestigial Sideband (VSB) modulated datastream containing high definition video data represented by a VSB symbol constellation and subject to exhibiting co-channel interference, said data having a data frame format constituted by a succession of data frames comprising a field sync component prefacing a plurality of data segments, a signal processing method comprising the steps of:

generating, from said received datastream, a demodulated symbol datastream which is oversampled at a multiple of the symbol rate of said received datastream;

filtering said demodulated datastream with more than a twelve sample delay to attenuate information at frequencies representing significant NTSC co-channel interference energy;

analyzing a unfiltered demodulated datastream and a filtered demodulated datastream from said filtering step for producing a control signal representing the relative interference content of said demodulated datastream and said filtered demodulated datastream; and an output network responsive to said control signal for conveying to an output channel said filtered demodulated datastream when said control signal indicates the presence of significant interference, and otherwise providing said demodulated symbol datastream to said output channel.

15. A method according to claim 14, wherein said oversampled datastream provided by said generating step is oversampled by a factor of two for providing two samples per symbol; and said filtering step exhibits a twenty four sample delay.

16. A method according to claim 15, wherein said filtering step produces a frequency spectrum constituted by non-overlapping upper and lower passbands disposed about a frequency corresponding to the symbol rate of said received datastream.

17. A method according to claim 16, wherein said received datastream is an 8-VSB modulated datastream; and said symbol rate of said received datastream is approximately 10.76 MHz.

* * * * *